United States Patent
Orth

[15] 3,665,306
[45] May 23, 1972

[54] PROCESS FOR MEASURING REVOLUTION SPEED OF A BODY

[72] Inventor: Peter Orth, Lippstadt, Germany
[73] Assignee: Herberlein Patent Corporation, New York, N.Y.
[22] Filed: Oct. 30, 1969
[21] Appl. No.: 872,491

[30] Foreign Application Priority Data
Nov. 18, 1968 Switzerland ..................17200/68

[52] U.S. Cl. ...........................324/174, 57/93, 57/77.45
[51] Int. Cl. ..................................................G01p 3/48
[58] Field of Search ..............324/161, 162, 173, 174, 163; 57/77.3, 77.45, 93

[56] References Cited

UNITED STATES PATENTS

| | | |
|---|---|---|
| 3,316,699 | 5/1967 | Mattingly..................................57/93 |
| 3,369,356 | 2/1968 | Mattingly..............................57/77.45 |
| 2,911,585 | 11/1959 | Tyson.....................................324/70 |
| 2,978,599 | 4/1961 | Wilcox....................................324/70 |

OTHER PUBLICATIONS

H. G. Jerrard and S. W. Punnet– An Electronic Tachometer– Journal of Sci. Instr.–27(9)–Sept. 1950– pp. 244, 245.

*Primary Examiner*—Michael J. Lynch
*Attorney*—Joseph M. Fitzpatrick, John Thomas Cella, Charles B. Cannon, Lawrence F. Scinto, Carroll G. Harper, Charles W. Bradley, Edwin T. Grimes, William J. Brunet and Robert L. Baechtold

[57] ABSTRACT

Process for measuring speed of revolution of a body in a magnetic field by forming the body to induce variations in the filed proportional to the speed of revolution of the body, inductively transferring such variations to a coil situated in the range of the magnetic field, and measuring the variations thus induced in the coil.

2 Claims, 3 Drawing Figures

Patented May 23, 1972 3,665,306
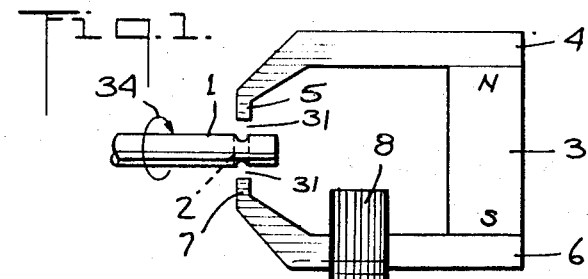
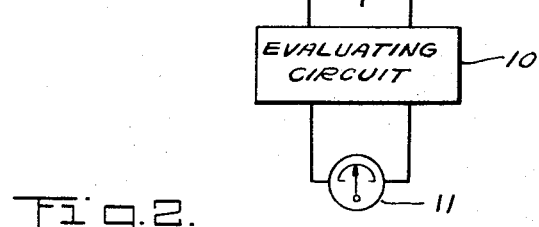
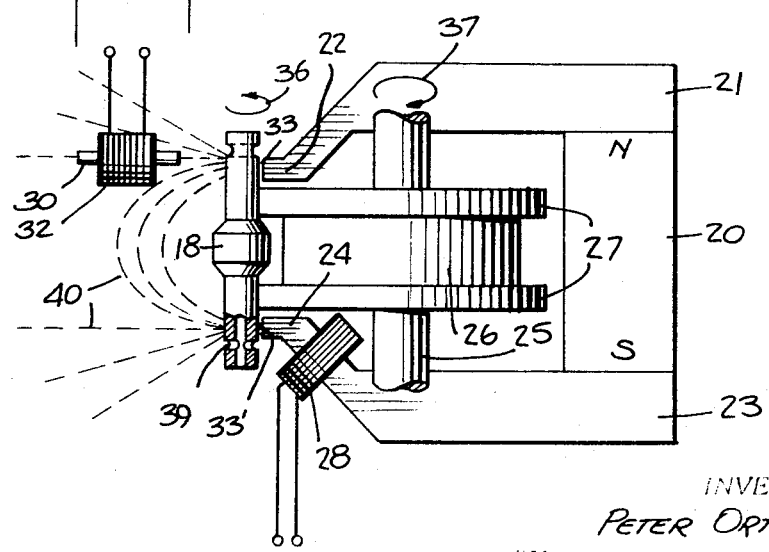
INVENTOR.
PETER ORTH
BY
Ward McClellanon Brooks Fitzpatrick
ATTORNEYS

PROCESS FOR MEASURING REVOLUTION SPEED OF A BODY

This invention relates to measurement of the speed of revolution of a body, and more particularly to measurement of such speed where the body is of magnetic material and revolves in a magnetic field.

It is known to measure electromagnetically the speed of revolution of shafts by placing on the shaft of an electric motor, for example, a disc, the periphery of which has been formed with cog-shaped or saw-tooth configurations. The air gaps thus existing between kerfs and the pole shoe of a magnet, in cooperation with the uncut parts of the disc, cause magnetic variations in the field of the magnet when the shaft is rotated. The variations are transferred as alternating voltages to a measuring device by means of an induction coil. In one known device of this type, two pole shoes are used in close proximity to each other and within an angle of revolution of the shaft of not more than 10° to attempt to obtain an amplification of the induced alternating voltages.

Other similar devices are known for measuring the speed of revolution of a shaft and the direction of rotation as well. These may employ saw-tooth-shaped air gaps on a disc affixed to the shaft and two separate impulse channels affecting a single pole shoe.

All of these known arrangements share a common disadvantage in that, due to the relationships between the depth of the air gap and the diameter of the disc; and between the width of the gap and the circumference of the disc, only small induced variations of the magnetic field are achieved. Additionally, with shafts of a diameter of the order of 5 mm or less, and speeds of revolution of 100,000 r.p.m. or more, it is impossible to obtain results that are free of the effects of shaft eccentricities and centrifugal force, except at great expense, and often not at all; and this problem is compounded by the addition of a disc, of the kind mentioned, to the shaft.

Accordingly, I have conceived a method for measuring the speed of revolution of a body in a magnetic field by which I am able to overcome the foregoing difficulties and disadvantages and to effect, by simple means, precise measurement of the revolution speeds of revolving bodies, even those having diameters of only a few millimeters and revolution speeds of 100,000 r.p.m. or more.

Thus, my contribution is directed broadly to a process for measuring electromagnetically, and without contacts, the speed of revolution of a magnetic body revolving in a magnetic field by sensing variations induced in the field by periodic variations of the magnetic resistance of the revolving body, which variations are inductively transferred to a coil in the range of influence of the field and are measured as alternating voltage impulses in the coil which are proportional to the speed of revolution.

Actually, I prefer to effect the variations in the magnetic field by shaping the body, a ferromagnetic shaft for example, or a part of the shaft, with contour variations so that the desired variations occur in the magnetic field when the shaft is revolved.

Further specific features and advantages of the invention will be hereinafter more fully set forth with reference to the annexed drawings, showing a presently preferred embodiment of the invention and certain modifications thereof, in which:

FIG. 1 is an elevational view of an arrangement for measuring the revolution speed of a shaft according to my invention;

FIG. 2 is a perspective view of a shaft and pole shoes illustrating one aspect of my invention; and FIG. 3 is a view similar to that of FIG. 1 for measuring the speed of revolution of a twist tube of a false twist device employed for crimping textile yarns.

Referring now to the drawings, and more particularly to FIG. 1, there is shown a shaft 1 revolving in direction of arrow 34, which is formed at one extremity with a central through-bore 2 running at right angles with respect to the longitudinal axis of the shaft. The diameter of this bore 2 corresponds approximately to the radius of the shaft 1. Two pole shoes 4 and 6, fixed on a permanent magnet 3, are shaped at their ends 5 and 7 so that they extend perpendicular with respect to the axis of revolution of the shaft 1. In this way, an air gap 31 is created between the pole shoe ends 5 and 7 and the periphery of the shaft 1, the resistance value of which has an influence on the magnetic field of the shaft 1. Since the radial bore 2 is in line with the two pole shoes 5 and 7, the air gap 31 varies upon rotation of the shaft 1, whereby a variation of the intensity of the magnetic field which is proportional with the shaft revolution speed occurs, as a result of which alternating voltages are created in the coil 8 arranged on the pole shoe 6. These alternating voltages are brought to an evaluating circuit 10 via a conductor 9 and to an indicating instrument 11.

In FIG. 2 I show a shaft 13 with two segmental flats 14 and 15 at its end, the arc length of each flat 14, 15 being at least equal to the radius of the shaft 13, and the bases of the flats being parallel with each other. The two pole shoes 16 and 17 are diametrically opposite and perpendicular as well as aligned with respect to the bases 38 of the flats 14 and 15. These segment-shaped incisions or flats also bring about a variation of the resistance of the magnetic field which is proportional to the revolution speed of the shaft 13.

An important field of application of the process of the present invention is the measuring of the revolution speed of the twist tubes of false-twist devices for texturing of textile yarns. Such twist tubes may have diameters of 5 mm or less and revolution speed of 100,000 r.p.m. and more. FIG. 3 shows such a false-twist device in which the twist tube 18, bored radially as at 39, is maintained pressed against the surfaces of discs 27 by a permanent magnet 20 with pole shoes 21, 23. The discs 27 are driven in rotation in the direction of arrow 37 by means of a driving shaft 25, and the twist tube 18 rotates in the direction of arrow 36. Between the pole shoe extremities 22 and 24 and the periphery of the twist tube 18, there are air gaps 33, 33', respectively, which are varied in proportion with the revolution speed by the radial bore 39. It will be appreciated that because of the relationship of the bore 39 to the pole shoe end 24, the magnetic flux is varied in the twist tube 18 and simultaneously varies the magnetic stray field 40 created between the pole shoe ends 22 and 24. The field variations are absorbed by the coil 28 at the pole shoe end 24 of the pole shoe 23.

In another execution according to FIG. 3, a coil 32 with an iron core 30 is placed opposite the pole shoe end 22 of the pole shoe 21 and in the range of the stray field 40 present between the two pole shoe ends 22 and 24 and the shaft 18, and measures the variation of the stray field created by the revolving shaft with its bore 39.

Instead of bores or segment-shaped cuts, other configurations of the periphery may be used, the free dimensions of which, running in peripheral direction of the rotating body, preferably at least approximately correspond to half the diameter of the twist tube to be able to effect a sufficient variation of the magnetic flux.

From the foregoing description, it will be seen that I have contributed, by my invention, a process for measuring the speed of revolution of revolving bodies while obviating the difficulties and disadvantages of earlier known methods. In particular, I am able to measure the speed of revolution of small shafts revolving at high speeds and without the need of discs or the like used in the past and which add to difficulties due to eccentricites, effects of centrifugal force and windage.

I believe that the operation of my novel process will now be understood and that the advantages of my invention will be fully appreciated by those persons skilled in the art.

I claim:

1. Process for electromagnetic measurement of the speed of revolution of a twist tube of a false twisting device wherein said twist tube is fabricated from magnetically susceptible material and has a pair of longitudinally spaced openings extending transversely of the axis thereof, said process comprising the steps of positioning the twist tube in contact with the peripheries of a pair of discs located in a magnetic field to maintain said twist tube pressed against the periphery of said discs, one being driven, and simultaneously positioning said tube between two opposite poles of the magnet, one pole end being adjacent one of said openings and the other pole end being adjacent the other opening, to vary the magnetic flux in the twist tube and simultaneously varying the magnetic stray field between the pole ends, positioning a coil in the range of influence of said stray field, and measuring the output of the coil to indicate the speed of revolution of said twist tube.

2. Process for the electromagnetic measurement of the speed of revolution of a twist tube of a false twisting device wherein said twist tube is fabricated from a magnetically susceptible material and has a pair of longitudinally spaced through bores extending transversely of the axis thereof, a process comprising the steps of positioning the twist tube in contact with the periphery of a pair of discs located in a magnetic field to maintain said shaft pressed against the periphery of said discs, one of said discs being driven, and simultaneously positioning said tube between two opposite poles of a magnet, one pole being adjacent and axially inwardly of one through bore and the other pole being adjacent and axially inwardly of the other through bore, to vary the magnetic flux in the twist tube and simultaneously vary the magnetic stray field between the pole ends positioning a coil to sense flux variations through the magnet produced by rotation of said twist tube and measuring the output of the coil to indicate the speed of revolution of said twist tube.

* * * * *